(12) United States Patent  
Wu (10) Patent No.: US 7,394,828 B1  
(45) Date of Patent: Jul. 1, 2008

(54) DATA FORMAT CONVERSION FOR VIRTUAL CONCATENATION PROCESSING

(75) Inventor: Zhao Wu, San Jose, CA (US)

(73) Assignee: PMC-Sierra, Inc., Santa Clara, CA (US)

( * ) Notice: Subject to any disclaimer, the term of this patent is extended or adjusted under 35 U.S.C. 154(b) by 1314 days.

(21) Appl. No.: 10/233,306

(22) Filed: Aug. 30, 2002

Related U.S. Application Data (60) Provisional application No. 60/316,375, filed on Aug. 30, 2001.

(51) Int. Cl.
 *H04J 3/00* (2006.01)
 *H04J 3/06* (2006.01)

(52) U.S. Cl. ........................ 370/476; 370/509
(58) Field of Classification Search ............... None
 See application file for complete search history.

(56) References Cited

U.S. PATENT DOCUMENTS

| 5,953,330 | A  | * | 9/1999 | Canniff et al. ............... 370/352 |
| 6,453,944 | B2 | * | 9/2002 | Bartlett .................. 137/601.01 |
| 6,600,745 | B1 | * | 7/2003 | Chopping .................... 370/394 |
| 6,750,687 | B1 | * | 6/2004 | Klecka, III .................. 327/153 |
| 6,751,238 | B1 | * | 6/2004 | Lipp et al. .................... 370/541 |
| 6,891,862 | B1 | * | 5/2005 | Brady et al. ................. 370/539 |
| 6,917,630 | B1 | * | 7/2005 | Russell et al. ............... 370/532 |
| 6,963,560 | B2 | * | 11/2005 | Sawey et al. ................. 370/353 |

* cited by examiner

*Primary Examiner*—Andrew C. Lee
(74) *Attorney, Agent, or Firm*—Townsend and Townsend and Crew LLP (57) ABSTRACT

A data format conversion method and apparatus are presented to convert time-slot interleaved SONET/SDH data to per time-slot data for virtual concatenation processing. The converter consists of an input buffer and a matrix transposer. The input buffer discards the overhead and fixed stuff bytes of each SPE that it receives, while the matrix transposer packs the N payload bytes into N-byte words with alignment to a start-of-frame indicator. Because each N-byte word is associated with a different time slot, the N-byte words form per time-slot data.

28 Claims, 5 Drawing Sheets

CYCLE: 0 1 2 3 4 5 6 7 8 9 10 11 ...

| | | | | | | | | | | | | | | | | |
|---|---|---|---|---|---|---|---|---|---|---|---|---|---|---|---|---|
| 0 | 4 | 8 | 12 | 16 | 20 | 24 | 28 | 32 | 36 | 40 | 44 | 0 | 4 | 8 | 12 | ... |
| 1 | 5 | 9 | 13 | 17 | 21 | 25 | 29 | 33 | 37 | 41 | 45 | 1 | 5 | 9 | 13 | ... |
| 2 | 6 | 10 | 14 | 18 | 22 | 26 | 30 | 34 | 38 | 42 | 46 | 2 | 6 | 10 | 14 | ... |
| 3 | 7 | 11 | 15 | 19 | 23 | 27 | 31 | 35 | 39 | 43 | 47 | 3 | 7 | 11 | 15 | ... |

DATA FORMAT CONVERSION FOR VIRTUAL CONCATENATION PROCESSING

CROSS-REFERENCES TO RELATED APPLICATIONS

The present application claims priority from the U.S. provisional patent application Ser. No. 60/316,375, filed Aug. 30, 2001 and entitled "RECEIVE VIRTUAL CONCATENATION PROCESSOR", the content of which is herein incorporated by reference in its entirety.

The present application is also related to the following U.S. patent applications, the contents of each of which is herein incorporated by reference in its entirety:

U.S. patent application Ser. No. 09/943,386, filed Aug. 30, 2001, and entitled "TRANSMIT VIRTUAL CONCATENATION PROCESSOR", U.S. patent application Ser. No. 10/126,466, filed Apr. 19, 2002, and entitled "DATA STREAM PERMUTATION APPLICABLE TO LARGE DIMENSIONS".

The present application is also related to copending application Ser. No. 10/232,962, entitled "RECEIVE VIRTUAL CONCATENATION PROCESSOR", filed contemporaneously herewith, and copending application Ser. No. 10/232,961, entitled "DIFFERENTIAL DELAY COMPENSATION", filed contemporaneously herewith, both assigned to the same assignee, and both incorporated herein by reference in their entirety.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to communications network, and more particularly to concatenation of channels in a communications network.

Demand for high performance communication networks capable of transporting multiple types of data, such as text, audio and video data, is on the rise. To carry greater amount of data over existing communication channels, such as fiber-optic communication channels, network carriers are increasingly using high bandwidth technologies, such as wave division multiplexing (WDM) and optical carrier (OC) level 48. Such communication networks rely upon high-performance packet switches, such as asynchronous transfer mode (ATM) switches, frame relay switches and internet protocol (IP) routers which route the incoming packets to their desired destinations.

A commonly known standard referred to as synchronous optical network (SONET) defines a synchronous frame structure for transmitting signals using time division multiplexing. The basic building block of a SONET frame, commonly referred to as synchronous transport signal-1 (STS-1) includes 810 bytes that are transmitted every 125 μsec. Therefore a SONET channel carrying STS-1 frames (i.e., an STS-1 pipe) has a bit rate of 51.84 Mb/s, which has a corresponding optical signal referred to as OC-1.

Many STS-1 pipes may be contiguously concatenated to achieve higher bandwidths. For example, three STS-1 pipes may be contiguously concatenated to transmit three STS-1 frames, thus to achieve a bit rate of 155.52 Mb/s. In the following, the designation –Nc (N is an integer) appended to STS indicates the number of STS-1 pipes that are contiguously concatenated. For example, STS-3c indicates contiguous concatenation of three STS-1 pipes. In a similar manner, STS-12c indicates contiguous concatenation of twelve STS-1 pipes.

STS-1 or STS-Nc frames transported over contiguously concatenated pipes travel as a single unit with the granularity of the larger concatenated pipes. For example, in a STS-12c traffic—which signifies concatenation of 12 STS-1 pipes—adding or dropping of data by add/drop multiplexers are carried out at 12c granularity. The higher granularity simplifies such tasks as error control, performance control and error monitoring of the contiguously concatenated data. Many smaller pipes may be concatenated to form a larger pipe. For example, to form a STS-12c pipe, either twelve STS-1 or four STS-3c may be concatenated. In contiguous concatenation, data carried in time-slots associated with the smaller pipes travel through the same paths and thus have substantially similar propagation delays. For example, all STS-1 frames of a contiguously concatenated STS-12c travel through the same path.

The number of pipes that may be contiguously concatenated is typically limited to integer multiples of four STS-3c pipes, e.g. STS-12c, STS-48c, STS-192c, etc. Consequently, if a user desires to transmit data at, e.g., five times the bandwidth of an STS-1 pipe (i.e., at STS-5c), the user is required to use a STS-12c pipe or higher. This results in inefficient and wasteful use of bandwidth and thus increases cost. Furthermore, many of networking devices currently deployed, such as add/drop multiplexers, only operate at the STS-1 or STS-3c levels. Therefore, even if, for example, STS-12c is allowed by the standards, because associated frames of such a pipe travel together as a bundle, every networking device disposed between the transmitting and the receiving end of such a pipe is required to process these frames at the 12-c level. Therefore, to the extent that many of the currently deployed networking devices are adapted to operate at STS-1 or STS-3c levels only, they are unable to handle STS-12c data frames, thus rendering such concatenated pipes ineffective.

To more efficiently utilize the SONET/SDH bandwidth, virtual concatenation has been developed. Virtual concatenation is defined, in part, by the ANSI T1-X1.5, which is an evolving standard. In accordance with the virtual concatenation, any number of smaller STS-1 or STS-3c pipes may be grouped together to form a larger pipe. For example, three STS-1 pipes may be virtually concatenated to form a STS-1-3v pipe. In the following, it is understood that –Nv (N is an integer) appended to either STS-1 or STS-3c designates the number of respective channels that are virtually concatenated. For example, STS-1-12v designates virtual concatenation of twelve STS-1 pipes. Similarly, STS-3c-16v designates virtual concatenation of sixteen STS-3c pipes.

In virtual concatenation, data carried in time-slots associated with the smaller pipes may travel through different paths with different propagation delays. Synchronization is maintained between the transmitting end and the receiving end such that the virtually concatenated channels appear as contiguously concatenated channels. Because virtual concatenation enables concatenation of any number of smaller pipes, it overcomes some of the above described problems associated with contiguously concatenated pipes. For example, virtual concatenation enables forming a STS-1-5v pipe which, as described above, does not have a contiguously concatenated counterpart pipe, i.e., there is no STS-5c pipe. Moreover, because in virtual concatenation, the basic building blocks STS-1 or STS-3c, i.e., the streams with the lowest granularity, are not bundled together, they are readily supported by currently deployed networking devices.

BRIEF SUMMARY OF THE INVENTION

A data format conversion method and apparatus are provided to convert time-slot interleaved SONET/SDH data to per time-slot data. The invention includes, in part, an input buffer and a matrix transposer. The input buffer is adapted to receive time-slot interleaved SONET/SDH data, extract and store only the payload bytes of each time-slot, and align the payload bytes with an associated frame pulse. The matrix transposer is adapted to read the payload data stored in the input buffer, pack them together and send out the per time-slot data.

The Input buffer includes a multitude of banks. Each bank includes a control logic and a random access memory (RAM). Each RAM is logically organized as arrays of queues each having a number of rows. Each queue is further adapted to receive and store payload bytes associated with a different one of the time-slots. The input buffer together with a matrix transposer of—both of which are disposed in a receive virtual concatenation processor (RVCP)—convert time-slot interleaved bytes of SONET/SDH frames to per time-slot data. A marriage network together with other logic blocks disposed in the RVCP convert the per time-slot data to per channel data as defined by a channel mapping and an associated programmable calendar. The data format conversion may be performed for a number of different channels carried via SONET frames of various sizes such as STS-12, STS-48, STS-192, STS-768.

The input buffer receives time-slot interleaved data carried via virtual or/and contiguous concatenation. The input buffer is adapted to handle virtual concatenation with any channel mapping at both STS-1 and STS-3c granularities. Data from each channel of the virtually concatenated channels is mapped to a number of STS-1 or STS-3c timeslots forming either STS-1-Xv or STS-3c-Xv traffic, where X is an integer. Since different constituent time-slots may travel through different paths, they may arrive at the receiver with different differential delays. In order to compensate for differential delays, the data is converted from time-slot interleaved SONET/SDH format to per time-slot format, so that each time-slot may be individually buffered and aligned.

The input buffer is also adapted to handle time-slot interleaved data received from contiguously concatenated channels whose data may be mapped to any multiple of STS-3c traffic, e.g., STS-6c, STS-9c, STS-12c, STS-48c, STS-192c. Furthermore, the input buffer is adapted to handle mixed concatenation in which some channels are contiguously concatenated and others are virtually concatenated. Data for all the channels is supplied via a STS-N frame and through a parallel Telecombus.

BRIEF DESCRIPTION OF THE DRAWINGS

FIG. 5A shows for each cycle and each bank the queue that is written to, in accordance with one embodiment of the present invention.

DETAILED DESCRIPTION OF THE INVENTION

An input buffer is adapted to receive incoming bytes of each SONET/SDH (hereinafter collectively refereed to as SONET) payload envelope (SPE), to extract and store the payload bytes of each SPE in one of its banks and to discard the overhead and fixed stuff bytes of each SPE that it receives. The payload bytes associated with the same time-slot are read and packed together and are supplied in groups aligned to the frame pulse associated with that time-slot.

The Input buffer includes a multitude of banks. Each bank includes a control logic and a RAM storage space. Each RAM storage space is organized as arrays of queues each having a number of rows. Each queue is further adapted to receive and store payload bytes associated with a different one of the time-slots. The input buffer may be embedded in a receive virtual concatenation processor (RVCP) adapted to convert time-interleaved bytes of SONET/SDH frames to per channel data defined by a channel mapping and an associated programmable calendar. The data buffering performed by the input buffer is scalable to support any number of different channels carried via SONET frames of various sizes such as STS-12, STS-48, STS-192, STS-768. The input buffer is adapted to handle both virtual and contiguous concatenation. For STS-1-Xv or STS-3c-Xv virtual concatenation traffic, the input buffer de-maps data to X number of STS-1 or STS-3c time slots, where X is an integer greater than 0.

The input buffer is also adapted to de-map channelized data received from contiguously concatenated channels whose data may be mapped to any multiple integers of STS-3c traffic, e.g., STS-6c, STS-9c, STS-12c, STS-15c, . . . , STS-48c, STS-192c. Furthermore, the input buffer supports mixed concatenation in which some channels are contiguously concatenated and others are virtually concatenated. Data for all the channels is supplied via a STS-N frame and through a parallel Telecombus. The input buffer is adapted to receive incoming time-slot interleaved bytes of each SPE, each of which has an associated time-slot, to remove the path overhead and fixed stuff from each SPE and to buffer the payload bytes in one of its internal queues before passing them to the matrix transposer.

Figure 1:
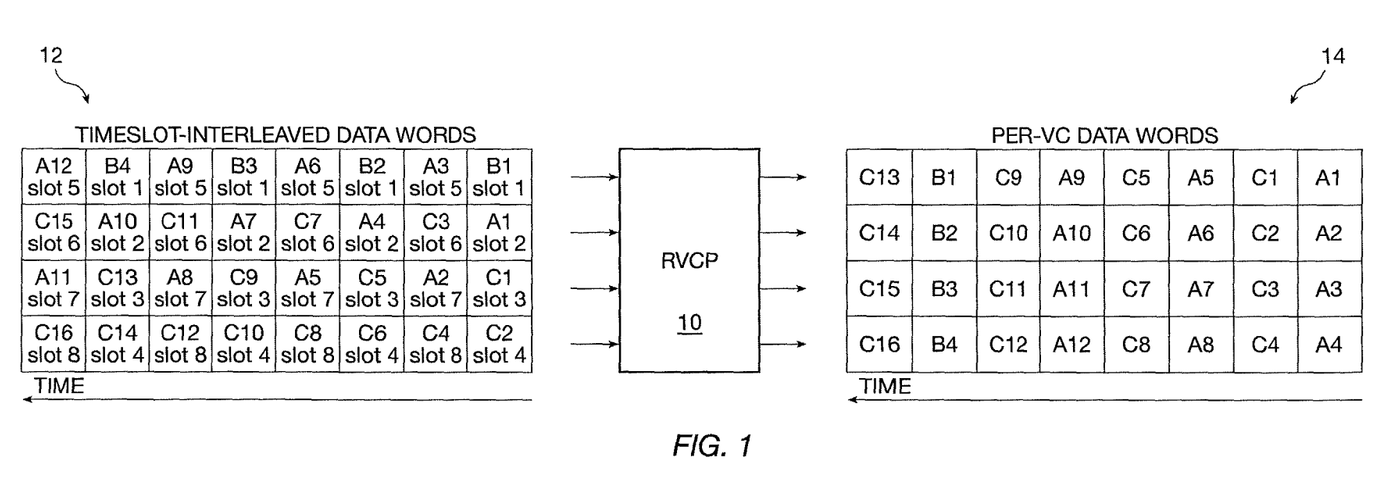
FIG. 1 shows mapping of time-slot interleaved data bytes of an STS-8 frame to per channel data as performed by a receive virtual concatenation processor, in accordance with one exemplary embodiment of the present invention.

FIG. 1 illustrates, by way of an example, the time-slot interleaved data received by an exemplary embodiment of an RVCP 10 in which the input buffer of the present invention is disposed, as well as the per-channel data that is supplied by RVCP 10. RVCP 10 is shown as having four input terminals and four output terminals. In accordance with the example shown in FIG. 1, three virtual channels A, B and C are mapped into an STS-8 frame whose bytes are delivered to RVCP 10 via a 4-byte wide data path. It is understood, however, that data may be delivered to RVCP 10 via a wider, e.g., 8, or narrower data path, e.g., 2. Each input terminal of RVCP 10 receives a different byte of the data. The data delivered to RVCP is shown in data array 12 of FIG. 1.

In the example shown in FIG. 1, three channels are shown, namely channels A, B and C. Each of these channels has a stream of data multiplexed over a number of time-slots and in accordance with the virtual concatenation stetting. For example, Channel A is adapted to deliver STS-1-3v traffic at time-slots 2, 7 and 5 of the STS-8 frame. Channel B is adapted to deliver STS-1 traffic at time-slot 1 of the STS-8 frame. Channel C is adapted to deliver STS-1-4v traffic at time-slots 3, 4, 6 and 8 of the STS-8 frame. As shown in data array 12 of FIG. 1, data bytes A1, A2 and A3 respectively arrive at time-slots 2, 7 and 5, data byte B1 arrives at time-slot 1, and data bytes C1, C2, C3 and C4 respectively arrive at time-slots 3, 4, 6 and 8. Accordingly, RVCP 10 de-maps data byte A1 from time-slot 2, data byte A2 from time-slot 7, and date byte A3 from time-slot 5. Similarly, RVCP 10 de-maps data byte B1 from time-slot 1, data byte C1 from time-slot 3, data byte C2 from time-slot 4, data byte C3 from time-slot 6 and data byte C4 from time-slot 8. Thereafter, RVCP 10 de-maps data byte A4 from time-slot 2 of the next STS-8 column, data byte A5 from time-slot 7 of the next STS-8 column, and date byte A6 from time-slot 5 of the next STS-8 column, etc.

The per channel data de-mapped by RVCP 10 appears at its output terminals and in the order shown in data array 14 of FIG. 1. As seen from data arrays 12 and 14, at each cycle of clock, four time-slot interleaved data bytes are received by RVCP 10 and four data bytes associated with one of the channels is supplied by RVCP 10. For example, in cycle 1 data bytes A1, A2, A3 and A4 are supplied by RVCP 10. In cycle 2, data bytes C1, C2, C3 and C4 are supplied by RVCP 10. The order in which the data bytes are de-mapped and appear at the output terminals of RVCP 10 is defined by a programmable calendar, as understood by those skilled in the art.

Data bytes occupying different time-slots of the same channel (hereinafter alternatively referred to as constituent time-slots) may experience different delays as they travel through their paths. The alignment logic, in accordance with the present invention, is adapted to compensate for such differential delays.

Matrix Transposer

Payload bytes belonging to different time-slots are stored separately in the input buffer 102. Matrix transposer 104 reads the payload bytes associated with multiple time-slots, packs them into W-byte words (where W is the number of banks in input buffer 102) and supplies the result in per time-slot format.

Figure 2:
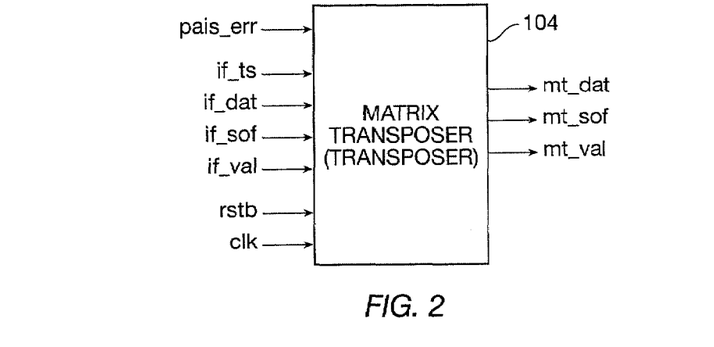
FIG. 2 shows various input/output signals of a matrix transposer, in accordance with one embodiment of the present invention.

FIG. 2 shows a block diagram of matrix transposer 104, hereinafter alternatively referred to as transposer 104. Transposer 104 receives, in part, a four-byte signal IF_DAT[31:0], a four-bit start-of-frame indicator signal IF_SOF[3:0], and a four-bit data valid flag signal IF_VAL[3:0]. Each bit of signal IF_SOF, each bit of signal IF_VAL and each 8-bits of IF_DAT are associated with a different one of the four banks of input buffer 102. For example, IF_DAT[31:24], IF_SOF[3] and IF_VAL[3] are associated with the same bank of input buffer 102. Signal IF_TS[1:0] identifies the current time-slot. Because transposer 104 receivers four bytes of data for each time-slot and aggregates the four bytes as a single 32-bit word on signal MT_DAT[31:0], signal IF_TS[1:0] is adapted to distinguish between time-slots 0 and 3 only.

Output signal MT_SOF indicates whether the 32-bit word MT_DAT[31:0] includes the first data byte in an SONET Payload Envelope (SPE). If the 32-bit word MT_DAT[31:0] includes the first data byte in an SPE, that byte is carried via MT_DAT[31:24]. If input buffer 102 does not include four valid bytes for a particular time-slot, then transposer 104 does not output a valid data, in which case signal MT_VAL designates that neither signal MT_DAT nor MT_SOF is valid. Input signal PAIS_ERR input indicates the presence of path AIS alarm on the time-slot pointed to by signal IF_TS[5:0]. If there is a path AIS alarm and the path AIS alarm handler 114 is enabled, signal MT_VAL is invalidated. Signal RSTB resets the registers disposed in matrix transposer 104 and signal CLK is a clock signal.

Figure 3:
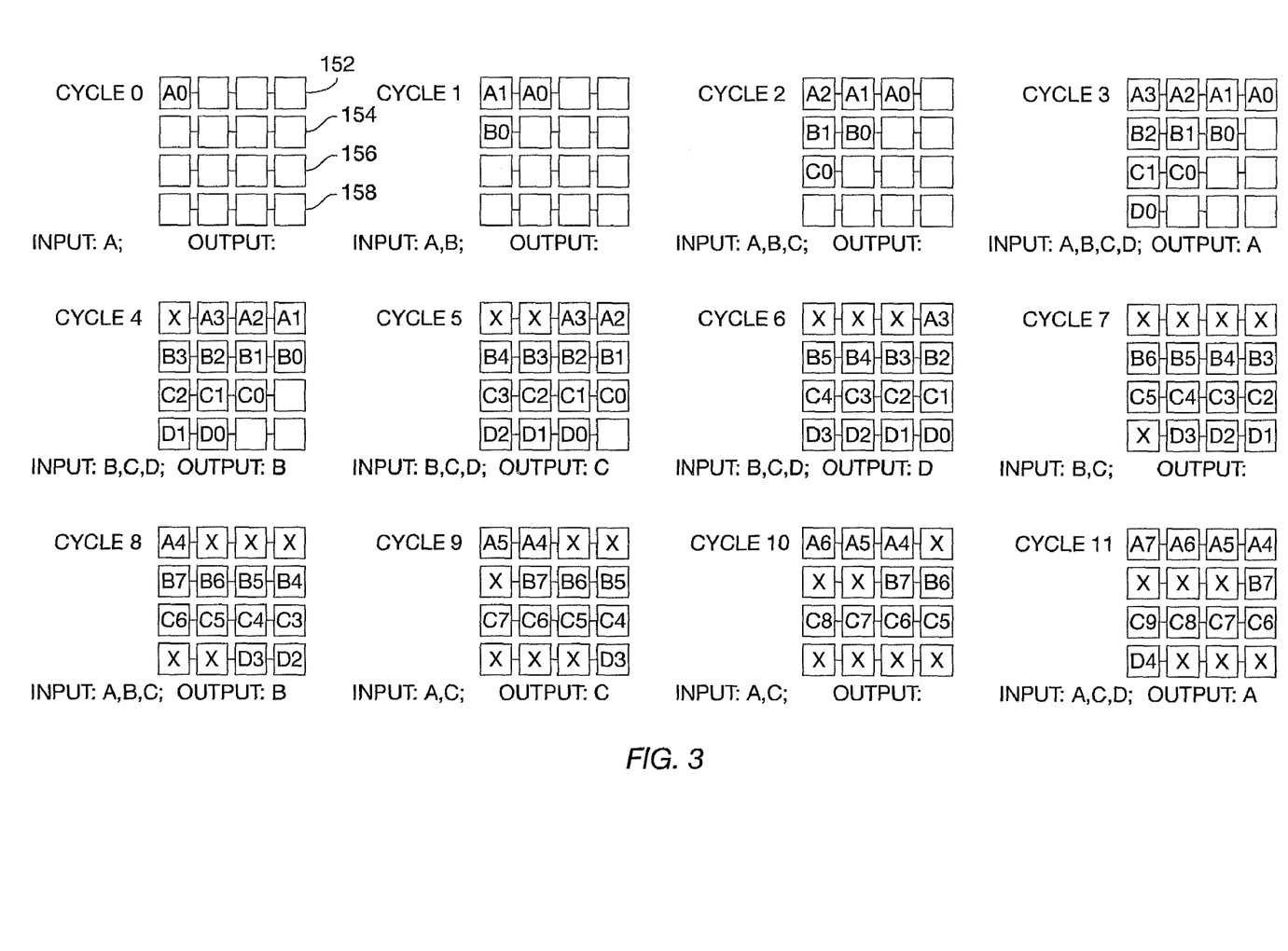
FIG. 3 shows movement of data bytes among various registers disposed in the matrix transposer of FIG. 2.

In one embodiment, the matrix transposer includes an array of registers to provide a delay network. For example, transposer 104 is shown in FIG. 3 as including four 8-bit four-stage shift registers 152, 154, 156 and 158. In FIG. 3; data bytes delivered from input buffer 102 banks 262, 264, 266 and 268 (see FIG. 4A) to shift registers 152, 154, 156, 158 are respectively designated as A, B, C and D. During every clock cycle, transposer 12 receives up to four bytes of data from input buffer 102 (each byte is received from a different bank of the input buffer).

Conversion of data format from time-slot interleaved to per-time-slot data is performed, in part, by shift registers 152, 154, 156, 158. Each of these shift registers is a serial-to-parallel shift register. Each of these shift registers thus serially reads in one byte of data per clock cycle from an associated input buffer 102 bank. When any of these shift registers has four bytes read in and is selected, it outputs its four bytes of data in one clock cycle. In some embodiments, the readout schedule for the input buffer banks is performed in accordance with a round-robin scheme. The readout is performed through 48 queues for STS-1 traffic, 16 queues for STS-3c traffic, and/or 4 queues for the STS-12c traffic; this results in timely and fair readout of all the queues. In some embodiments, the readout schedule for the shift registers is also based on a round-robin scheme.

FIG. 3 shows the data written in and read out of each of the shift registers 152, 154, 156 and 158 of transposer 104. During cycles 0 through 3, input buffer 102 bank 268 delivers four bytes {A0, A1, A2, A3} to shift register 152. Therefore, during clock cycle 3, shift register 152 outputs 32-bit word {A0, A1, A2, A3}. During the next four cycles 4 through 7, no data is transferred from input buffer 102 bank 268 to shift register 152. Accordingly, no data is output from shift register 152 during clock cycle 7. During cycles 8 through 11, input buffer 102 bank 268 transfers another four bytes of data to shift register 152, namely data bytes {A4, A5, A6, A7}. Accordingly, during clock cycle 11, shift resister 152 outputs 32-bit word {A4, A5, A6, A7}. In a similar manner, shift registers 154, 156 and 158 respectively store and deliver during different clock cycles the 32-bit data they receive from input buffer 102 banks 266, 264 and 262. For example, shift register 154 stores and delivers data during cycles 1-4, 5-8, 9-12. Shift register 156 stores and delivers data during clock cycles 2-5, 6-9, etc.

If an input buffer bank does not have four bytes stored therein, transposer invalidates the output four clock cycles later. Transposer 104 determines whether each input buffer 102 bank has four bytes stored therein before it outputs the four bytes for that bank (i.e., once every four cycles). Therefore, if an input buffer bank does not have four bytes at the time such a determination is made by transposer 104 but accumulated four bytes while data is read from other input buffer 104 banks, no data is transferred out from that bank until twelve cycles later.

Input Buffer

Input buffer 102 receives incoming bytes of each SONET payload envelope (SPE) via a Telecom bus. In response, for each time-slot input buffer 102 extracts and stores the payload bytes in one of its banks. Input buffer 102 discards the overhead and fixed stuff bytes of each SPE that it receives. The payload bytes stored in input buffer 102 banks are read out in bursts such that the payload bytes associated with the same time-slots are packed together. For example, assume that each time-slot has four payload bytes associated therewith. Such four payload bytes are stored in the same queue at various clock cycles. Each byte of such four bytes is subsequently read from the input buffer 102 bank by matrix transposer 104 during four consecutive cycles of the clock. During the last cycle of the four-clock cycle, the four individual bytes are supplied by the matrix transposer as a 32-bit word. In a more general case, in accordance with the present invention, input buffer 102 extracts the W payload bytes associated with each time-slot to enable matrix transposer 104 to pack the W extracted payload bytes to form an W-byte word. The operation of input buffer 102 is described below with reference to STS-48 traffic. However, it is understood that input buffer 102 is adapted to handle any kind of traffic, i.e., STS-N where N is an integer greater than zero.

Figure 4A:
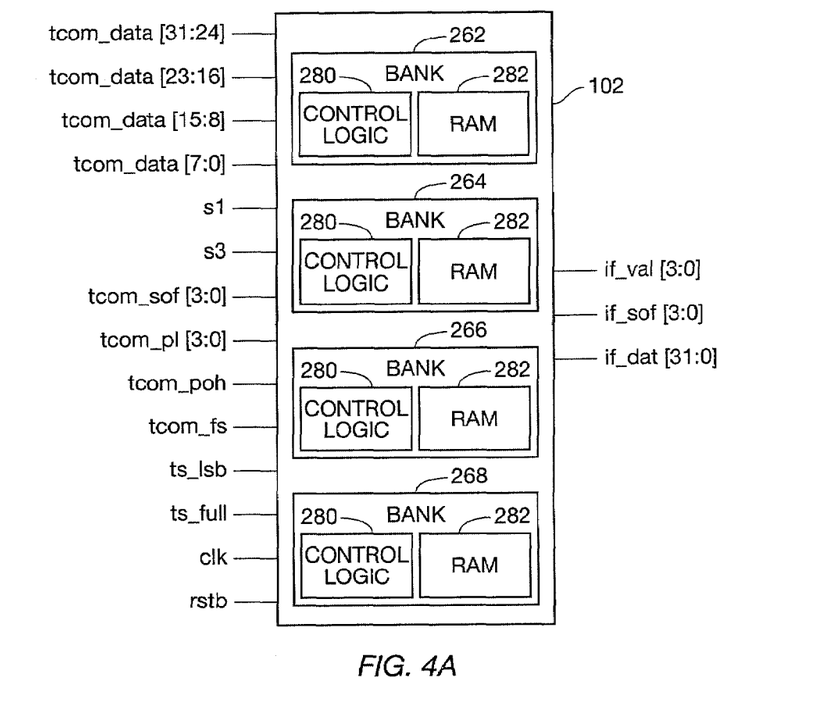
FIG. 4A is a simplified block diagram of an input buffer, in accordance with one embodiment of the present invention.

FIG. 4A is a simplified block diagram of an exemplary input buffer 102 in accordance with one embodiment of the present invention. Each byte of an incoming SONET frame is received by a different one of input buffer 102 terminals and is supplied to a different one of input buffer 102 banks.

Depending on the mode of operation, each bank of input buffer 102 is adapted to include a number of logical queues, each queue corresponding to N STS-1 time-slots or N/3 STS-3c time-slots in STS-N traffic. For STS-1 time-slot, each bank of input buffer 102 is adapted to include twelve logical queues, each having 8 rows. For STS-3c time-slot, each bank of input buffer 102 is adapted to include four queues each having 24 rows. The mapping between STS-3c and STS-1 time-slots for STS-48 is shown in Table II below. For STS-N traffic, input buffer 102 is adapted to include N queues each queue having 2W rows, where W is the number of banks disposed in the input buffer.

signal TCOM_DAT[23:16] and receives start-of-frame indication via signal TCOM_SOF[2]; etc.

Figure 4B:
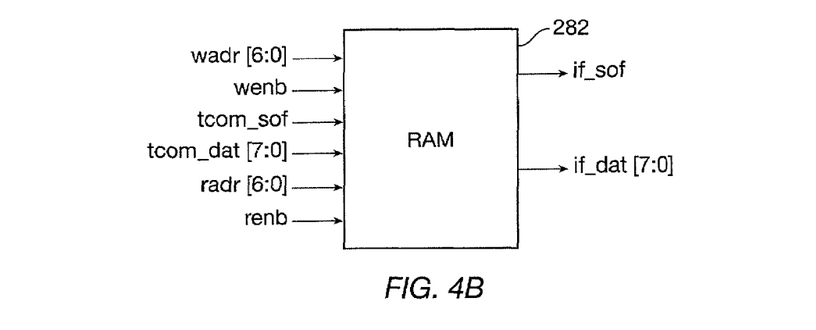
FIG. 4B is a simplified block diagram and associated input/output signals of a RAM queue of the input buffer of FIG. 4A, in accordance with one embodiment of the present invention.

The RAM 282 disposed in each bank outputs a data byte IF_DAT and a start of frame indicator signal IF_SOF, as shown in FIG. 4B. The control logic of each bank outputs a flag signal IF_VAL that is asserted if data IF_DAT and signal IF_SOF are valid. Since the time-slots associated with each of the four banks are independent of each other, at any given time one or more of these banks may output valid data and/or start of frame indicator signals.

Input signals S1 and S3 collectively select between STS-1 traffic, STS-3c traffic and mixed STS-1/STS-3c traffic. For example, if signal S1 is at a high logic level and signal S3 is at a low logic level, incoming traffic is an STS-1 traffic. In the following, it is assumed that an STS-48 frame is formed by 48 STS-1 frames. Each transition of input signal TCOM_SOF indicates the arrival (i.e., the beginning) of a new STS-1 frame disposed in the STS-48 frame with reference to which the present invention is described below. Signal TCOM_SOF is a four bit signal each bit of which is associated with a different one of input buffer 102 banks. Arrival of each new STS-48 frame is indicated by a transition on signal JO associated with that STS-48 frame, as is known in the art. Therefore, between two adjacent transitions of signal JO there are 48 transitions of signal STS_SOF.

Input signal TCOM_PL[3:0] is a 4-bit signal, each bit of which is associated with a different one of the banks 262, 264, 266 and 268. For example, TCOM_PL[3] is associated with bank 262 and indicates whether TCOM_DAT[31:24] is a payload byte. Similarly, TCOM_PL[2] indicates whether TCOM_DAT[23:16] is a payload byte. As described above, only the payload bytes are stored in RAMs 282.

Input signal TCOM_POH[3:0] is a 4-bit signal, each bit of which is associated with a different one of the banks 262, 264, 266 and 268. For example, TCOM_POH[3] is associated with bank 262 and indicates whether TCOM_DAT[31:24] is a path overhead byte. Similarly, TCOM_POH[2] indicates whether TCOM_DAT[23:16] is a path overhead byte. As described above, the path overhead bytes are discarded and thus are not written in RAMs 282.

TABLE II

| STS-3c timeslot | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| STS-1 timeslot | 0 | 1 | 2 | 3 | 4 | 5 | 6 | 7 | 8 | 9 | 10 | 11 | 12 | 13 | 14 | 15 |
| | 16 | 17 | 18 | 19 | 20 | 21 | 22 | 23 | 24 | 25 | 26 | 27 | 28 | 29 | 30 | 31 |
| | 32 | 33 | 34 | 35 | 36 | 37 | 38 | 39 | 40 | 41 | 42 | 43 | 44 | 45 | 46 | 47 |

The exemplary embodiment of the input buffer 102 of FIG. 4A is shown as having four banks, namely banks 262, 264, 266 and 268. It is understood, however, that other embodiments of the input buffer of the present invention may have more or fewer banks. Each bank includes a control logic 280 and a random access memory (RAM) 282 (alternatively referred to hereinbelow as a RAM or a memory). The RAM 282 of each bank has 96 addressable storage spaces each adapted to store 9 bits. The 96 addressable storage space of RAM is logically divided into 12 smaller queues each having 8 rows (i.e., addressable storage spaces). The RAM 282 disposed in bank 262 is adapted to store payload bytes received via signal TCOM_DAT[31:24] and receives start-of-frame indication via signal TCOM_SOF[3]; the RAM 282 disposed in bank 264 is adapted to store payload bytes received via Input signal TCOM_FS[3:0] is a 4-bit signal, each bit of which is associated with a different one of the banks 262, 264, 266 and 268. For example, TCOM_FS[3] is associated with bank 262 and indicates whether TCOM_DAT[31:24] is a fixed stuff byte. Similarly, TCOM_FS[2] indicates whether TCOM_DAT[23:16] is a fixed stuff byte. As described above, the fixed stuff bytes are discarded and thus are not written into RAMs 282. Signal RSTB resets the sequential logic elements, i.e., registers disposed in input buffer 102. Signal CLK provides a clock signal to input buffer 102.

As described above, each bank 262, 264, 266 and 268 includes a RAM 282 and a control logic 280. FIG. 4B shows a simplified block diagram and associated input/output signals of each RAM 282. Except for signal TCOM_DAT, each input signal of each RAM 282 is generated by the control logic block associated with that RAM. For example, the input signals applied to the RAM disposed in bank 262 are generated by the control logic block disposed in bank 262. As described above, each RAM 282 has twelve queues. Each queue of each RAM 282 has 8 rows, with each row adapted to store one associated payload byte and one bit that indicates whether the byte is the first payload byte of the associated SPE. In response to the received signals, each RAM 282 supplies an 8-bit data stored therein, namely IF_DAT, and a 1-bit IF_SOF signal that indicates if IF_DAT is the first payload byte of the associated SPE.

For the RAM 282 in each bank, input signal WADR supplies the address to which a payload byte TCOM_DAT and start-of-frame flag TCOM_SOF are written. Input signal RADR supplies the address from which a byte is read. Input signals WENB and RENB respectively enable write and read operations of RAM 282. The 8-bit output signal IF_DAT is the data read from RAM 282. Output signal IF_SOF is a start of frame indicator and when asserted indicates that data IF_DAT read from the RAM is associated with a new frame. As described above, the input signals received by each RAM 282 are generated by their associated control logic 280.

Signal TS_LSB[3:0] is a 4-bit signal that counts from 0 to 11. At each transition of signal CLK, signal TS_LSB is incremented by one count. When signal TS_LSB has a value of eleven, it is reset to zero at the next transition of signal CLK. Each count of signal TS_LSB points to a different one of the queues in each RAM 282 disposed in each of banks 262, 264, 266 and 268. For example, when signal TS_LSB has a count of zero, it points to the first queue of each RAM 282 of each of banks 262, 264, 266 and 268 to store data. Similarly, when signal TS_LSB has a count of, e.g., 3, it points to the fourth queue of each RAM 282 of each of banks 262, 264, 266 and 268 to store data. Signal TS_FULL[5:0] is a 6-bit signal that counts from 0 to 47. Therefore, each count of signal TS_FULL points to a different time-slot of the incoming STS-48 frames.

Payload bytes are stored in each bank in a round-robin fashion. Data array 300, shown in FIG. 5A, represents the order in which data in each time-slot (hereinafter alternatively referred to as time-slot) is stored in its associated RAM. In each cycle of clock signal CLK, one payload byte is written into each RAM 282 of each of banks 262, 264, 266 and 268.

In the example shown in FIG. 5A, bank 262 (in FIG. 4A) is adapted to store data carried during the twelve time-slots 0, 4, 8, 12, 16, 20, 24, 28, 32, 36, 40 and 44, as shown in row 302 of data array 300. Similarly, bank 264 is adapted to store data carried during the twelve time-slots 1, 5, 9, 13, 17, 21, 25, 29, 33, 37, 41 and 45, as shown in row 304 of data array 300. For example, as seen from data array 300, during cycle 0 the data carried during time-slot 0 (also referred to below as time-slot 0) is written to a corresponding RAM location of bank 262. Similarly, during the same cycle, time-slot 1 is written to a corresponding RAM location of bank 264; time-slot 2 is written to a corresponding RAM location of bank 266; and time-slot 3 is written to a corresponding RAM location of bank 268. A data byte is stored in a RAM only if it is a payload byte.

As seen from cycles 0-11 of rows 302, 304, 306 and 308, one byte associated with each of time-slots 0-47 is stored in RAMs 282. After four such 12 cycles, the four bytes associated with each time-slot are stored in RAMs 282. The frequency for writing into each time-slot is 12 cycles of signal CLK.

The readout of data stored in RAMs 282 is also performed in accordance with a round-robin scheme, but with a larger granularity than that used to write the data in the RAMs. The control logic for each bank reads each queue four times before it starts reading the next queue. However, prior to each four consecutive reads, a queue is checked to determine if it includes at least four bytes. If a queue does not include at least four bytes, nothing is read out from that queue during the subsequent four cycles. Each queue is reset upon receiving an associated signal TCOM_SOF[3:0]. As described further below, signal TCOM_SOF synchronizes the write and read pointers so that the data read from RAMs 282 and supplied by matrix transposer 104 are aligned with respect to their associated TCOM_SOF signal.

Figure 5B:
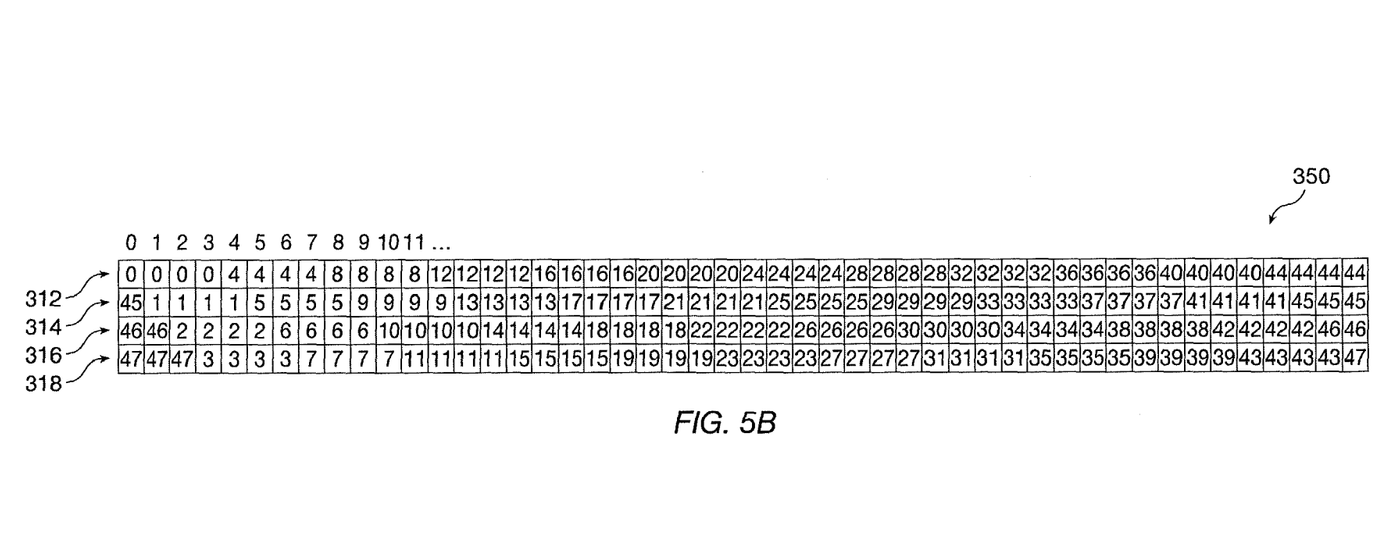
FIG. 5B shows for each cycle and each bank the queue that is read from, in accordance with one embodiment of the present invention.

Data array 350, shown in FIG. 5B, shows the order in which data carried in each time-slot is read from its associated RAM 282. For each RAM 282, the read and write operations are independent of one another. The time-slots shown in row 312 correspond to those being read in RAM 282 of bank 262, and they also correspond to the time-slots shown in row 302 of FIG. 5A. Similarly, the time-slots shown in row 314 correspond to those being read in RAM 282 of bank 264, and they also correspond to the time-slots shown in row 304 of FIG. 5A.

As seen from FIG. 5B, during cycle 0, time-slot 0 is read from its corresponding RAM position in bank 262, time-slot 45 is read from its corresponding RAM position in bank 264, time-slot 46 is read from its corresponding RAM position in bank 266, and time-slot 47 is read from its corresponding RAM position in bank 268. Similarly, during cycle 1, time-slots 0, 1, 46 and 47 are respectively read from banks 262, 264, 266 and 268, and so on.

By the end of cycle 3, four bytes of data associated with time-slot 0 are read from bank 262 and supplied by matrix transposer 104. By the end of cycle 4, four bytes of data associated with time-slot 1 are read from bank 264 and supplied by matrix transposer 104. Accordingly, as seen from data array 350, during each cycle, four bytes of data associated with the same time-slot are supplied by matrix transposer 104. Matrix transposer 104 reads out and supplies the four bytes of data for each time-slot via MT_DAT with alignment to the TCOM_SOF signal associated with that time-slot.

Even though each of the twelve queues of each RAM 282 has eight rows (i.e., is 8 bytes deep), each such queue is adapted so as not to contain more than 7 bytes at any given time in order to prevent overflow. In accordance with the present invention, when there is a transition on signal TCOM_SOF associated with a time-slot, the write pointer corresponding to the RAM 282 position in which that time-slot is stored, is set back to a 4-byte boundary relative to the read pointer for that RAM 282 position. Accordingly, a RAM queue is not read from if it has less than four bytes stored therein. Furthermore, only four bytes are read from a RAM queue that has four or more bytes stored therein, as described further below.

When TCOM_SOF indicates a new SPE, if the queue corresponding to the SPE contains between 0 and 3 bytes, then the write pointer for that queue is made the same as the read pointer for that queue so that the queue appears to have no data stored therein and therefore no data will be read from that queue. If the queue corresponding to the SPE has four bytes stored therein, then the read and write pointers for that queue are not changed so that the four bytes will be read from that queue. If the queue corresponding to the SPE contains between 4 and 7 bytes, then the write pointer for that queue is adjusted to be four more than the read pointer for that queue so that four bytes will be read from that queue. In other words, the adjustment of the write pointer relative to the read pointer is done at four-byte boundaries. Write pointer is adjusted by making the two least significant bits of the write pointer the same as those of the read pointer. As a result, the most significant byte of the per time-slot data as read from the input buffer is aligned to an SPE since the number of payload bytes in an SPE is a multiple of four. The two least significant bits of the read pointer are not stored, since each read operation performs a burst of either 0 or 4 bytes.

As described above, the four payload bytes associated with each time-slot are read sequentially during four clock cycles from an associated RAM and are supplied as a 4-byte word by matrix transposer 104 in one clock cycle. For example, matrix transposer 104 reads the four payload bytes of time-slot 1 from bank 264 sequentially in four clock cycles and supplies these four bytes in parallel in a single clock cycle. The reading of payload bytes for various time-slots is performed by matrix transposer in a pipe-lined fashion, as seen from FIG. 3. Matrix transposer 104 outputs per time-slot data. For example, as shown in FIG. 5B, matrix transposer 104 outputs the four payload bytes of time-slot 0 during clock cycle 3, outputs the four payload bytes of time-slot 1 during clock cycle 4, outputs the four payload bytes of time-slot 2 during clock cycle 5, etc.

Because for STS-N traffic, input buffer 102 is adapted to include N queues each queue having 2W rows, where W is the number of banks disposed in the input buffer, a queue can accept incoming bytes while outputting a W-byte word to matrix transposer 104. Since the read side is faster than the write side—because the write side is adapted to drop overhead and fixed stuff bytes—a queue does not overflow. Furthermore, because the read side is adapted to read out W bytes if and only if a queue has at least W bytes, a queue does not underflow.

For contiguous concatenations, an STS-Nc queue is treated as N/3 STS-3c queues, thereby enabling input buffer 102 to handle any concatenation (e.g. STS-6c, STS-9c, STS-12c, . . . ). Moreover, because input buffer 102 treats contiguous concatenation traffic and virtual concatenation traffic similarly (e.g. an STS-15c frame looks like STS-3c-5v frame), the RVCP data path is adapted to support both virtual concatenation and contiguous concatenation. Because input buffer 102 maps each constituent time-slot of an STS-1-Xv or STS-3c-Xv traffic to an STS-1 or STS-3c queue, input buffer 102 has a minimized susceptibility to data rate variations. For STS-Nc contiguous concatenation, since the N constituent timeslots are locked together, there is no rate variation within the STS-Nc traffic flow.

The above embodiments of the present invention are illustrative and not limitative. For example, the invention is not limited by the number or type of channels that are concatenated. Nor is the invention limited to the type of traffic flowing through the channels. The invention is not limited by the type of hardware or software adapted to perform the above inventions. Furthermore, it is understood that the above inventions may be performed by either software modules, hardware modules or a combination of both. Other variations, modifications, additions, deletions, and equivalents will be apparent to a person skilled in the art and are intended to fall within the scope of the appended claims.

What is claimed is:

1. A method comprising:
   receiving time-slot interleaved streams of data carried via a SONET payload envelope (SPE);
   extracting W payload bytes associated with each time-slot of the time-slot interleaved data;
   storing the W extracted payload bytes associated with each time-slot;
   retrieving the W stored payload bytes that are associated with each time-slot in parallel so as to pack the W stored payload bytes into a word having W bytes;
   aligning the W-byte word with an associated frame pulse such that the most significant byte in the W-byte word includes a first payload byte of the SPE when a start-of-frame indicator is generated.

2. The method of claim 1 further comprising:
   forming a write pointer associated with each of the time-slots and for the storing of each of the N extracted payload portion; and
   forming a read pointer associated with each of the time-slots and for the retrieval of each of the N extracted payload portion.

3. The method of claim 2 further comprising:
   setting the write pointer equal to the read pointer for a time slot if less than W payload portions associated with that time-slot are stored when a frame pulse is received.

4. The method of claim 3 further comprising:
   setting the write pointer greater than the read pointer for a time slot if the number of payload portions associated with that time-slot is between W and 2W−1 when a frame pulse is received.

5. The method of claim 4 wherein $\mathrm{Log}_2 W$ least significant bits of the write pointer is made the same as that of the read pointer.

6. The method of claim 1 wherein said concatenated channels include contiguously concatenated channels.

7. The method of claim 1 wherein said concatenated channels include virtually concatenated channels.

8. The method of claim 1 wherein said concatenated channels include both contiguously and virtually concatenated channels.

9. The method of claim 6 wherein the contiguously concatenated channels are adapted to carry STS-Mc traffic, wherein M is a multiple integer of three and greater than zero.

10. The method of claim 1 wherein said time-slot interleaved data are received via SONET frames carrying STS-12N traffic, wherein N is a multiple integer of four.

11. The method of claim 7 further comprising:
    mapping each portion of data received from the virtually concatenated channels to a time slot associated with STS-1 traffic to form STS-1-Mv traffic, where M is an integer greater than zero.

12. The method of claim 7 further comprising:
    mapping each portion of data received from the virtually concatenated channels to a time slot associated with STS-3c traffic to form STS-3c-Mv traffic, where M is an integer greater than zero.

13. The method of claim 7 further comprising:
    mapping a first portion of data received from the virtually concatenated channels to a number of time-slots associated with STS-1 traffic to form STS-1-Mv traffic and further to map a second portion of data received from the virtually concatenated channels to a second number of time-slots associated with STS-3c traffic to form STS-3c-Ov traffic, wherein M and O each is an integer greater than zero.

14. The method of claim 13 further comprising:
    discarding overhead and fixed stuff of each SONET frame received via the stream.

15. A circuit comprising:
    an input buffer further comprising:
        input terminals adapted to receive W streams of time-slot interleaved bytes carried via a SONET payload envelop (SPE), each byte in each of the W streams associated with a different one of T time-slots;
        a control logic adapted to extract T payload bytes each payload byte associated with one of the T time-slots; and a memory having W banks each adapted to store a different subset of the T extracted payload bytes; and a matrix transposer adapted to retrieve W payload bytes that are associated with a same time-slot in parallel so as to pack the W stored payload bytes into a word having W bytes; the matrix transposer further adapted to align the W-byte word with an associated frame pulse such that the most significant byte in the W-byte word is a first payload byte of an SPE when there is a start-of-frame indication.

16. The circuit of claim 15 wherein each input buffer bank further comprises:

a plurality of write pointers each associated with a different one of the T time-slots and each to point to a location in which a next payload segment is to be stored; and a plurality of read pointers each associated with a different one of the T time-slots and each to point to a location from which a next payload portion is read.

17. The circuit of claim 16 wherein in each bank the write pointer is set equal to the read pointer for a time slot if less than W payload segments associated with that time-slot are stored in that bank when a frame pulse is received.

18. The circuit of claim 17 wherein in each bank the write pointer is set to be greater than the read pointer for a time slot if the number of payload segments associated with that time-slot is between W and 2W−1 when a frame pulse is received.

19. The circuit of claim 18 wherein for each queue the $Log_2 W$ least significant bits of the write pointer is made the same as that of the read pointer.

20. The circuit of claim 15 wherein said concatenated channels include contiguously concatenated channels.

21. The circuit of claim 15 wherein said concatenated channels include virtually concatenated channels.

22. The circuit of claim 15 wherein said concatenated channels include both contiguously and virtually concatenated channels.

23. The circuit of claim 22 wherein the contiguously concatenated channels are adapted to carry STS-Mc traffic, wherein M is a multiple integer of three and greater than zero.

24. The circuit of claim 15 wherein said time-slot interleaved data are received via SONET frames carrying STS-12N traffic, wherein N is a multiple integer of four.

25. The circuit of claim 21 further comprising:

mapping each portion of data received from the virtually concatenated channels to a time slot associated with STS-1 traffic to form STS-1-Mv traffic, where M is an integer greater than zero.

26. The circuit of claim 21 further comprising:

mapping each portion of data received from the virtually concatenated channels to a time slot associated with STS-3c traffic to form STS-3c-Mv traffic, where M is an integer greater than zero.

27. The circuit of claim 21 further comprising:

mapping a first portion of data received from the virtually concatenated channels to a number of time-slots associated with STS-1 traffic to form STS-1-Mv traffic and further to map a second portion of data received from the virtually concatenated channels to a second number of time-slots associated with STS-3c traffic to form STS-3c-Ov traffic, wherein M and O each is an integer greater than zero.

28. The circuit of claim 27 wherein said circuit discards overhead and fixed stuff of each SONET frame received via the stream.

* * * * *